United States Patent Office 3,510,475
Patented May 5, 1970

3,510,475
POLYNUCLEAR SUBSTITUTED AMINOKE-
TONES, THEIR SALTS AND INTERME-
DIATES THEREFOR
Edward J. Nikawitz, Glen Rock, N.J., assignor to Gi-
vaudan Corporation, Clifton, N.J., a corporation
of New Jersey
No Drawing. Continuation-in-part of application Ser. No.
535,034, Mar. 17, 1966. This application Mar. 1, 1967,
Ser. No. 619,564
Int. Cl. C07d 41/04
U.S. Cl. 260—239                                  10 Claims

ABSTRACT OF THE DISCLOSURE

A new class of plant fungicides effective against downy mildew and other fungi is disclosed. The new compounds have the general formula:

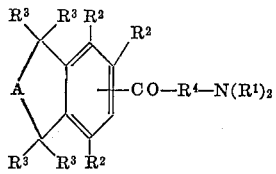

wherein A is a member selected from the group consisting of $(R^3)_2C=$ and

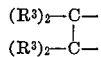

$R^1$ is at least one member selected from the group consisting of H, an alkyl radical having from 1 to 7 carbon atoms, a cycloalkyl radical having from 1 to 7 carbon atoms, an aralkyl radical having from 1 to 7 carbon atoms in the side chain and an alkylene radical having from 2 to 7 carbon atoms and bound to N so as to form an aza-cycloalkane group or an aza-cycloalkene group, $R^2$ is at least one member selected from the group consisting of H, an alkyl radical having from 1 to 5 carbon atoms, $NO_2$ and a trifluoromethyl radical, $R^3$ is at least one member selected from H and an alkyl radical having from 1 to 5 carbon atoms, and $R^4$ is a member selected from the group consisting of an alkenylene radical having from 3 to 5 carbon atoms and an alkylene radical having from 1 to 5 carbon atoms; and salts of said compounds with acids and phenols.

---

The present invention relates to novel chemical compounds and to a process for preparing same.

This application is a continuation-in-part of my copending application, Ser. No. 535,034, filed Mar. 17, 1966 now abandoned.

More particularly, the compounds of this invention may be represented by the following general formula:

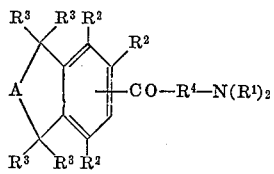

wherein A is a member selected from the group consisting of $(R^3)_2C=$ and

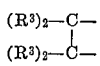

$R^1$ is at least one member selected from the group consisting of H, an alkyl radical having from 1 to 7 carbon atoms, a cycloalkyl radical having from 1 to 7 carbon atoms, an aralkyl radical having from 1 to 7 carbon atoms in the side chain and an alkylene radical having from 2 to 7 carbon atoms and bound to N so as to form an aza-cycloalkane group or an aza-cycloalkene group; and $R^2$ is at least one member selected from the group consisting of H, an alkyl radical having from 1 to 5 carbon atoms, $NO_2$ and a trifluoromethyl radical; and $R^3$ is at least one member selected from H and an alkyl radical having from 1 to 5 carbon atoms; and $R^4$ is a member selected from the group consisting of an alkenylene radical having from 3 to 5 carbon atoms and an alkylene radical having from 1 to 5 carbon atoms; and salts of said compounds with acids and phenols.

It is understood that the substituent radicals may be normal or branched, and that where $R^1$ is a bivalent alkylene radical, $N(R^1)_2$ may be an aza-cycloalkane group or aza-cycloalkene group, with or without additional hetero atoms, such as O, S and N, in the ring.

Salts encompassed by this invention include salts of inorganic and organic acids, as well as salts of phenols. Examples of such acids and phenols include hydrochloric acid, hydrobromic acid, phosphoric acid, acetic acid, malic acid, benzoic acid, salicylic acid, maleic acid, succinic acid, phenol, halogenated phenols, alkyl phenols, bis-phenols and halogenated bis-phenols.

The novel compounds of this invention have utility as plant fungicides, as for instance, against downy mildew such as *Phytophtora infestans* (potato blight) and *Peronospora tabacina* (blue mold of tobacco).

Although the fungicidal compounds of this invention can be used in the pure state to protect plants from fungal organisms, it is preferable and more efficient to apply them formulated with inert carriers or diluents. The concentration of the active compounds in these formulations can vary widely from 0.001% to 50.0% by weight depending on their use and method of application and provided that quantities lethal to the fungi are deposited on the plant surface. These compositions can be used in the form of dry dusts or wettable powders using suitable solid diluents such as talc, bentonite, kieselguhr diatomaceous earth, etc. Likewise, the compositions can exist as aqueous dispersions of the compounds or aqueous emulsions of the compounds in various suitable organic solvents as exemplified by kerosene, naphtha, benzene, liquid alkanes, etc. The surfactants used to prepare the various wettable, dispersable, and emulsifiable formulations can be of the anionic type such as the well known sodium dodecylbenzene sulfonate or the non-ionic type such as the polyoxyethylene derivatives of the mono- fatty acid esters of sorbotol. The selection of the type of formulation, the most suitable diluents and the concentration is determined by the specific use of the composition, the method of application and the cost and availability of the diluents.

The following procedures were used to test the plant fungicidal activity of the compounds of this application:

(A) In vitro activity (1) Against *Botrytis cinerea* (grey mold).—Paraffin rings with a diameter of 9 mm. were mounted on a microscopic slide. The test compound was dissolved in suitable solvents. The solutions were adjusted to various concentrations (1,000 mg./l., 100 mg./l., 10 mg./l., 1 mg./l.) and 0.5 ml. of each solution was added by means of a micropipette into the rings. After evaporation of the solvent, the slides were transferred into humid Petri dishes and 30 mg. of a suspension of spores of *Botrytis cinerea*, containing 60–70.000 spores/ml. in a nutrient solution of 1.25% were added into each ring. The Petri dishes were incubated for 24 hours at 100% relative humidity and 20° C.

The degree of prevention of spore germination was assessed by microscopic observation.

(2) Against *Phytophthora infestans* (late blight or tomato blight).—In general, the test procedure is identical with that for *Botrytis cinerea*. However, 30 mg. of a suspension of zoosporangia of *Phytophthora infestans*, containing 30.000 spores/ml. were added. The slides were placed into Petri dishes with 100% relative humidity inside. The dishes were cooled to 5° for 3 hours and then incubated at 20° C. for 24 hours.

(3) Against *Venturia inaequalis* (apple scab or black spot).—General procedure as being described for *Botrytis cinerea*; 30 mg. of a spore suspension of *Venturia inaequalis* in distilled water, containing 30–50.000 spores/ml. were employed. The Petri dishes were incubated for 24 hours at 100% relative humidity at 20° C.

(B) In vivo activity (1) Against *Phytophtora infestans* on young tomato plants.—Five young plants of *Solanum lycopersicum* (tomato) in the four-leaf stage, each in a pot of 8 cm. diameter, were sprayed with 0.05% and in a second series with a 0.005% solution of the pertinent compound. The spray was applied to the point of run-off. After 24 hours, a suspension of spores of *Phytophthora infestans* containing about 200.000 spores/ml. was sprayed onto the plants to the point of run-off. The tomato plants were incubated at 100% relative humidity at the following temperatures: 24 hours at 11° C., 24 hours at 17° C., and 96 hours at 22° C. After this period, the leaf area destroyed by Phytophthora was estimated in comparison to the total leaf area of each plant.

(2) Against *Erysiphe cichoriacearum* (cucumber mildew) on cucumber plants.— (a) Curative test: Cucumber seedlings were infected by dusting with young conidia of the test organism. After about ten days the cotyledons exhibited uniform coverage with mildew.

Suspensions or solutions of the test compounds in water (concentration 500 p.p.m.) were applied to the plants with a spray gun to the point of run off. The treated plants were incubated at 20–22° in an incubator equipped with fluorescent light. The activity of the test compound was determined by comparison of the infected leaf area after the ten days period and after the incubation period.

(b) Preventive test: Healthy cucumber seedlings were *first* treated with the test compound and then infected by procedures described in (a).

Test data are summarized in the following table:

In general, the aminoketones of this invention may be prepared by reacting, in the presence of a suitable solvent, a compound having the formula:

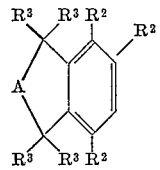

wherein A, $R^2$ and $R^3$ are as set forth above, with a member selected from the group consisting of $$Cl—CO—R^4—hal$$

and the anhydride of $Cl—R^4—COOH$, wherein $R^4$ is as set forth above and hal is a halogen, in the presence of a catalyst for Friedel-Crafts reactions, and reacting the resulting reaction product having the formula:

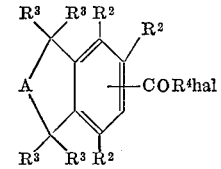

with a compound having the formula, $HN(R^1)_2$, wherein $R^1$ is the same as set forth above, in the presence of an acid acceptor.

Compounds in which $R^4$ is $—CT_2—CH_2—$ (see Example 5, infra) are preferably prepared by the "Mannich" reaction according to the following general procedure.

Compounds of the general formula:

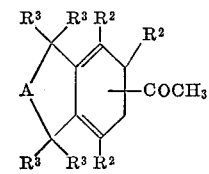

are brought to reaction with formaldehyde and a primary or secondary amine (preferably as hydrochlorides) in a suitable solvent. In general, stoichiometric amounts of the reactants are used. Alcohols, as for instance ethanol or propanol, are preferably employed as solvents at reflux temperature; and the reaction time is about 1 hour to 10 hours.

TABLE I

| Ex. No. | Compound | In vitro tests | | | Tests on plants (greenhouse) | | |
| --- | --- | --- | --- | --- | --- | --- | --- |
| | | *Phytophtora infestans* (potato blight) | Venturia (scab) | Botrytis (grey mold) | *Erysiphe cichoriacearum* (cucumber mildew) | | *Phytophtora infestans* (late blight on tomatoes) |
| | | | | | Curative | Preventive | |
| 3 | 1,1,4,4-tetramethyl-6-ethyl-7-(4-hexa-methyleniminobutyryl)-1,2,3,4-tetra-hydronaphthalene maleate. | + | + | + | | | + |
| 5 | 1,1,4,4-tetramethyl-6-ethyl-7-(3-hexa-methyleniminopropionyl)-1,2,3,4-tetra-hydronaphthalene hydrochloride. | | + | | | | |
| 4 | 1,1,4,4-tetramethyl-6-ethyl-7-(4-hexa-methyleniminobutyryl)-1,2,3,4-tetra-hydronaphthalene. | + | + | + | | | |
| 6 | 1,1,4,4-tetramethyl-6-ethyl-7-(4-diethyl-aminobutyryl)-1,2,3,4-tetra-hydro-naphthalene maleate. | + | + | + | + | | + |
| 7 | 1,1,4,4-tetramethyl-6-ethyl-7-(4-mor-pholinobutyryl)-1,2,3,4-tetrahydro-naphthalene maleate. | + | + | + | + | | + |
| 8 | 1,1,4,4-tetramethyl-6-isopropyl-7-(4-hexa-methyleniminobutyryl)-1,2,3,4-tetra-hydronaphthalene maleate. | + | + | + | + | | + |
| 9 | 1,1,3,3,5-pentamethyl-6-(4-hexa-methyleniminobutyryl)-indan maleate. | + | + | + | + | + | + |
| 10 | 1,1,4,4-tetramethyl-6-ethyl-7-(4-isopropyl-aminobutyryl)-1,2,3,4-tetrahydro-naphthalene hydrochloride. | + | + | + | + | | + |

+ means active; blank indicates no data available.

The aminoketones thus obtained, as hydrochlorides, can be converted to the free aminoketones by treatment with alkali.

In forming the intermediates for the aminoketones of this invention, stoichiometric amounts of the reactants and catalyst are desirably employed, although a moderate excess of any of these reagents may be used.

The catalysts employed in the preparation of the novel intermediates for the aminoketones of this invention include $AlCl_3$, $AlBr_3$, $FeCl_3$, $SbCl_5$, $TiCl_4$ and $SnCl_4$.

Suitable solvents which may be employed in the preparation of the aforesaid intermediates include carbon tetrachloride or other halogenated hydrocarbons such as ethylene dichloride, nitrobenzene and carbon disulfide.

The formation of the aforesaid intermediates is carried out at low temperatures, e.g., from $-10°$ C. to $10°$ C., temperatures around $0°$ C. being preferred. The reaction period, i.e., until evolution of hydrogen chloride ceases, is about 6 hours.

The formation of the novel aminoketones from the aforesaid intermediates is conducted in the presence of a suitable solvent and an acid acceptor. Suitable solvents include toluene, benzene, ethyl alcohol and dioxanes. Any acid acceptor may be used, examples being anhydrous sodium carbonate, anhydrous potassium carbonate, as well as the aforesaid reactant, $HN(R^1)_2$.

Stoichiometric amounts of the intermediate, $HN(R^1)_2$ and acid acceptor are employed, desirably, in the formation of the novel aminoketones. Temperatures within the range from about $80°$ C. to about $130°$ C. give excellent results, the time of reaction being of the order of about 2 hours or more. In the event the amine, $HN(R^1)_2$, boils below about $80°$ C., the reaction is conducted in a closed system.

In general, the salts of this invention are formed from stoichiometric amounts of the aminoketones and acid or phenolic material, by recrystallization from a suitable solvent or mixture of solvents. The particular solvent or mixture which is suitable for a given salt can easily be ascertained by an organic chemist skilled in the art.

In order more fully to illustrate this invention, the following examples are given, temperatures being in degrees centigrade, unless otherwise stated.

EXAMPLE 1

Preparation of 1,1,4,4-tetramethyl-6-ethyl-7(4-chlorobutyryl)1,2,3,4-tetrahydronaphthalene

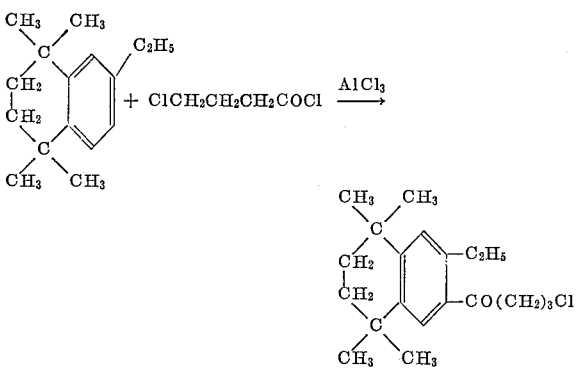

4-chlorobutyryl chloride tech. (70.5 g.) was added at $0°$ over a period of 20 minutes to a suspension of 67 g. of aluminum chloride and 300 ml. of carbon tetrachloride, being agitated rapidly in a one l. flask fitted with a sealed stirrer, a thermometer, a dropping funnel and a reflux condenser, the top of which was connected to a scrubber for hydrogen chloride.

1,1,4,4-tetramethyl-6-ethyl-1,2,3,4 - tetrahydronaphthalene (108 g.) was added at $0°$ over a period of three hours. Agitation at $0°$ was continued for 3½ hours. The batch was then poured onto a mixture of 500 g. of ice and 100 ml. of conc. hydrochloric acid. After melting of the ice, the carbon tetrachloride layer was separated, washed first with 200 ml. of 5% hydrochloric acid and then four times with water. After drying with anhydrous sodium sulfate, the filtered solution was freed of the solvent by distillation at a pressure of about 150 mm. The residue, a yellowish oil, weighed 148.1 g.

The product was recrystallized from 250 ml. of methanol. After standing over night in the freezer, the crystals were filtered and recrystallized from 250 ml. of methanol (Darco used). On filtering the hot solution, some of the product crystallized on the filter. This portion (II) was recrystallized from an additional 200 ml. of methanol. Both fractions were allowed to crystallize at room temperature.

Yields: Fraction I, 59.4 g., M.P. 79–82°; Fraction II, 31.8 g., M.P., 80–83°; color, slightly greenish.

*Analysis.*—Fraction II for $C_{20}H_{29}ClO$. Calcd. (percent): C, 74.85; H, 9.11. Found (percent): C, 75.53; H, 9.63. 1,1,4,4 - tetramethyl - 6 - ethyl - 7(4-chlorobutyryl)-1,2,3,4-tetrahydronaphthalene.

From the concentrated combined mother liquors, 17.3 g. melting at $73°$ were isolated.

EXAMPLE 2

1,1,4,4-tetramethyl-6-ethyl-7-(4-hexamethyleniminobutyryl)-1,2,3,4-tetrahydronaphthalene Fraction II of Example 1 (32.1 g.) hexamethylenimine (22.0 g.) and 150 ml. of toluene were charged into a one l. flask fitted with a sealed stirrer, a thermometer and a reflux condenser. After refluxing for 20 hours, and standing overnight, the batch was poured into water. The toluene layer was washed with water and dried with anhydrous sodium sulfate. The filtered solution was freed of the toluene by distillation at a pressure of about 150 mm. The residual oil (42.4 g.) was distilled at a pressure of 3 mm.

| B.P., ° C.: | Weight |
|---|---|
| 195–210 | 1.6 |
| 210–230 | 2.3 |
| 230–238 | 27.9 |

The desired compound (Fraction 3) was found to be effective as a plant fungicide against downy mildew such as *Phytophtora infestans* (potato blight) and *Peronosporo tabacina* (blue mold of tobacco) when employed in accordance with the above-mentioned or other known procedures.

EXAMPLE 3

1,1,4,4-tetramethyl-6-ethyl-7-(4-hexamethyleniminobutyryl)-1,2,3,4-tetrahydronaphthalene maleate Fraction 3 of Example 2 (27.6 g.) was dissolved in 100 ml. of isopropyl ether. The solution was filtered from a small amount of an insoluble material. The filter was washed with 100 ml. of isopropyl ether. The combined filtrate was charged into a 500 ml. flask fitted with a sealed stirrer and a reflux condenser. Maleic acid (8.3 g.) and 40 ml. of absolute alcohol were added. The mixture was dissolved by refluxing for 5 minutes. The filtered solution was allowed to crystallize in the refrigerator.

Yield: 27.6 g. white; M.P., 134–135°.

*Analysis.*—Calcd. for $C_{30}H_{45}NO_5$ (percent): C, 72.11; H, 9.08. Found (percent): C, 72.35; H, 9.12.

The resulting compound was found to be effective as a plant fungicide against downy mildew such as *Phytophtora infestans* (potato blight) and *Peronospora tabacina* (blue mold of tobacco) when employed in accordance with the above-mentioned or other known procedures.

EXAMPLE 4

1,1,4,4-tetramethyl-6-ethyl-7-(4-hexamethyleniminobutyryl)-1,2,3,4-tetrahydronaphthalene The compound of Example 2 (Fraction 3) was made in purer form by regenerating it from the compound made in accordance with Example 3, as follows:

The compound of Example 3 (25.5 g.) was suspended in 50 ml. of S.D. ethyl alcohol #30; caustic soda 30% (20 ml.) was added and then 200 ml. of water. After agitation for 5 minutes, the mixture was extracted with 100 ml. of benzene. The extract was washed four times with 200 ml. of water each time. After drying with sodium sulfate and filtration, the benzene was distilled at a pressure of about 200 mm. The residual oil was kept for 30 minutes at a pressure of 4 mm. at a temperature of 60°.

Yield: 16.6 g. of a thick, slightly yellowish oil with weakly aminic odor; $n_D^{20}$, 1.5320.

Analysis.—Calcd. for $C_{26}H_{41}NO$ (percent): C, 81.40; H, 10.77; N, 3.65. Found (percent): C, 81.70; H, 10.89; N, 3.37.

EXAMPLE 5

1,1,4,4 - tetramethyl-6-ethyl-7-(3-hexamethyleniminopropionyl)-1,2,3,4-tetrahydronaphthalene hydrochloride 1,1,4,4 - tetramethyl - 6 - ethyl - 7 - acetyl - 1,2,3,4-tetrahydronaphthalene (51.6 g.), hexamethylenimine hydrochloride (27.2 g.), paraformaldehyde (9 g.), 60 ml. of ethanol and 0.6 ml. of conc. hydrochloric acid were agitated and refluxed for one hour in a 250 ml. flask fitted with a sealed stirrer and a reflux condenser. Paraformaldehyde (6 g.) was added and the batch was refluxed an additional 2 hours. Hot acetone (400 ml.) was mixed with the contents of the flask; after standing overnight in the refrigerator, the precipitated white solid was filtered, washed with little acetone and dried at a pressure of 4 mm. Yield: 49.5 g.

It was dissolved in hot alcohol (160 ml.); ethyl ether (400 ml.) was added to the filtered solution. After 20 hours, the crystalline white product was filtered, washed with ice-cold alcohol/ether (16:40) and dried in H.V.

Yield: 42 g.; M.P., 184–185°, cloudy melt.

Analysis.—Calcd. for $C_{25}H_{40}ClNO$ (percent): C, 73.95; H, 9.90; Cl, 8.7. Found (percent): C, 73.97; H, 9.69; Cl, 8.4.

The compound is insoluble in water, rather soluble in alcohol.

The compound of this example was found to be effective as a plant fungicide against downy mildew such as *Phytophtora infestans* (potato blight) and *Peronospora tabacina* (blue mold of tobacco) when employed in accordance with the above-mentioned or other known procedures.

EXAMPLE 6

1,1,4,4-tetramethyl-6-ethyl-7-(4-diethylaminobutyryl)-1,2,3,4-tetrahydronaphthalene maleate 1,1,4,4 - tetramethyl - 6 - ethyl - 7(4 - chlorobutyryl)-1,2,3,4-tetrahydronaphthalene (42 g.), diethylamine (65 g.) and toluene (200 ml.) were charged into a rocking autoclave, applying an initial pressure of nitrogen of 60 lbs. The mixture was then heated for 7 hours at 120–125°. The maximum pressure observed was 115 lbs.

The reaction mixture was then poured into 1,000 ml. of water. The toluene layer was washed twice with water and freed of the solvent by distillation at 200 mm. The crude product, after drying for 30 minutes at 50° at a pressure of 4 mm., weighed 43.5 g.

A solution of the crude product (35.7 g.) and maleic acid (11.7 g.) in 100 ml. of alcohol was refluxed for 6 minutes. After standing in the freezer overnight, with 200 ml. ether the crystals were filtered, washed with alcohol/ether (10:20) and dried. Yield: 27.4 g.; M.P. 139–140°.

The crystallization was repeated using 70 ml. of alcohol and 100 ml. of ether. Yield: 24.7 g.; M.P. 141–142°.

Analysis.—Calcd. for $C_{28}H_{43}NO_5$ (percent): C, 71.00; H, 9.15; N, 2.96. Found (percent): C, 71.31; H, 8.88; N, 2.81.

The compound is insoluble in water, soluble in acetone.

The compound of this example was found to be effective as a plant fungicide against downy mildew such as *Phytophtora infestans* (potato blight) and *Peronospora tabacina* (blue and of tobacco), when employed in accordance with the above-mentioned or other known procedures.

EXAMPLE 7

1,1,4,4-tetramethyl-6-ethyl-7-(4-morpholinobutyryl)-1,2,3,4-tetrahydronaphthalene maleate 1,1,4,4-tetramethyl-6-ethyl - 7 - (4 - chlorobutyryl)-1,2,3,4-tetrahydronaphthalene (48 g.), morpholine (29 g.) and toluene (230 ml.) were brought to reaction according to the procedure of Example 2. The crude product (not distilled) weight 53.1 g.; $n_D^{20}$, 1.5340.

The crude product (37.1 g.) was dissolved in 180 ml. of warm alcohol; maleic acid (11.7 g.) was added and the mixture was refluxed for 3 minutes. Isopropyl ether (230 ml.) was added to the filtered, hot solution. After standing for 2 days in the freezer, the crystals were filtered, washed with 30 ml. of ice-cold alcohol/isopropyl ether (18:20) and dried at a pressure of 4 mm. at 50°. Yield: 35.8 g.; M.P. 162–167°.

Recrystallization (at room temperature) was repeated with 150 ml. of alcohol and 20 ml. of ethyl ether. Yield: 31.2 g.; M.P. 171–173°.

Analysis.—Calcd. for $C_{28}H_{41}NO_6$ (percent): C, 68.96; H, 8.47; N, 2.87. Found (percent): C, 68.95; H, 8.38; N, 2.93.

The compound is insoluble in water; soluble in acetone.

The compound of this example was found to be effective as a plant fungicide against downy mildew such a *Phytophtora infestans* (potato blight) and *Peronospora tabacina* (blue mold of tobacco), when employed in accordance with the above-mentioned or other known procedures.

EXAMPLE 8

1,1,4,4-tetramethyl-6-isopropyl-7-(4-hexamethyleniminobutyryl)-1,2,3,4-tetrahydronaphthalene maleate 1,1,4,4-tetramethyl - 6 - isopropyl - 7 - (4 - chlorobutyryl)-1,2,3,4-tetrahydronaphthalene was prepared as follows:

Aluminum chloride (40 g.) and carbon tetrachloride (200 ml.) were charged into a 1 liter flask fitted with a sealed stirrer, a thermometer, a reflux condenser with scrubber for hydrochloric acid and a dropping funnel. 4-chlorobutyryl chloride (42.5 g.) was added to the agitated suspension at 0° over a period of 15 minutes.

6-isopropyl-1,1,4,4-tetramethyl - 1,2,3,4 - tetrahydronaphthalene (69 g.), dissolved in 20 ml. of carbon tetrachloride was then added at 0° over a period of 2½ hours. Agitation at 0–3° was continued for 3 hours.

The reaction product was quenched on ice. The carbon tetrachloride layer was washed once with 5% hydrochloric acid, three times with water and then freed of the solvent by distillation at a pressure of 200 mm. The remaining crude product was a white solid. Yield: 91.8 g.

It was recrystallized from methanol (200 ml.); Yield: 64 g.; M.P. 80–82°.

Analysis.—Calcd. for $C_{21}H_{31}ClO$ (percent): C, 75.31; H, 9.33; Cl, 10.59. Found (percent): C, 75.43; H, 9.49; Cl, 10.22.

The compound is insoluble in water; soluble in acetone.

1,1,4,4-tetramethyl-6-isopropyl-7 - (4 - chlorobutyryl)-1,2,3,4-tetrahydronaphthalene (40 g.), hexamethylenimine (26.6 g.) and toluene (250 ml.) were brought to reaction according to the procedure of Example 2. The crude product not distilled weighed 46.4 g; $n_D^{20}$, 1.5273.

The crude product (39.7 g.), maleic acid (11.7 g.) and alcohol (150 ml.) were refluxed for 6 minutes. Ethyl ether 200 ml. was added to the filtered, warm solution. After standing over night in the freezer, 37 g. of white crystals with a M.P. of 154–155° were obtained by filtration and drying.

Recrystallization from toluene (250 ml.) yielded 35 g. melting at 155–156°.

*Analysis.*—Calcd. for $C_{31}H_{47}NO_5$ (percent): C, 72.48; H, 9.22; N, 2.73. Found (percent): C, 72.46; H, 9.18; N, 2.78.

The compound is insoluble in water, soluble in acetone.

The compound of this example was found to be effective as a plant fungicide against downy mildew such as *Phytophtora infestans* (potato blight) and *Personospora tabacina* (blue mold of tobacco), when employed in accordance with the above-mentioned or other known procedures.

EXAMPLE 9

1,1,3,3,5-pentamethyl-6-(4-hexamethylenimino-butyryl)-indan maleate 1,1,3,3,5-pentamethyl - 6 - (4-chlorobutyryl)-indan was prepared as follows:

Aluminum chloride (53 g.), 4-chlorobutyryl chloride (56 g.), carbon tetrachloride (240 ml.) and 1,1,3,3,5-pentamethylindan (77 g.) were brought to reaction as described in Example 8 for the preparation of 1,1,4,4-tetramethyl-6-isopropyl-7 - (4 - chlorobutyryl) - 1,2,3,4-tetrahydronaphthalene, with an additional one hour agitation period, at room temperature. Yield of the crude product: 111.2 g.

Recrystallization yielded 64.2 g. of white crystals, using 250 ml. of methanol as solvent (freezer). At room temperature, the crystals deliquesced.

*Analysis.*—Calcd. for $C_{18}H_{25}ClO$ (percent): C, 73.83; H, 8.61; Cl, 12.11. Found (percent): C, 73.90; H, 8.62; Cl, 12.14.

The compound is insoluble in water, soluble in acetone.

1,1,3,3,5 - pentamethyl - 6 - (4 - chlorobutyryl)-indan (29.3 g.), hexamethylenimine (25 g.) and toluene (250 ml.) were brought to reaction according to the procedure of Example 2. Yield of the crude product (not distilled): 35 g. of a brown oil.

The crude product (25 g.), maleic acid (8.2 g.) and alcohol (60 ml.) were refluxed 3 minutes. Ethyl ether (300 ml.) was added to the warm filtrate. After standing over night in the freezer, the crystals were filtered, washed with ether and dried. Yield: 23.8 g.; M.P. 161–163°.

Recrystallization from 100 ml. of toluene yielded 22.7 g. melting at 163–164°.

*Analysis.*—Calcd. for $C_{28}H_{41}NO_5$ (percent): C, 71.30; H, 8.76; N, 2.97. Found (percent): C, 71.56; H, 9.02; N, 2.84.

The compound is insoluble in water, soluble in acetone.

The compound of this example was found to be effective as a plant fungicide against downy mildew such as *Phytophtora infestans* (potato blight) and *Peronospora tabacina* (blue mold of tobacco), when employed in accordance with the above-mentioned or other known procedures.

EXAMPLE 10

1,1,4,4-tetramethyl-6-ethyl-7-(4-isopropylaminobutyryl)-1,2,3,4-tetrahydronaphthalene hydrochloride 1,1,4,4-tetramethyl-6-ethyl-7-(4-chlorobutyryl) - 1,2,3,4-tetrahydronaphthalene (48 g.), isopropylamine (80 g.) and toluene (180 ml.) were brought to reaction according to the procedure of Example 6. Time: 7 hours; temperature: 125°; pressure observed 125–129 lbs.

Yield of the crude product: 46.5 g., greenish resin. It was distilled in H.V.

| Pressure, mm. | B.P., C.° | Weight (g.) | $n^{20}$ | |
|---|---|---|---|---|
| 1 | 0.7 | Until 153 | 1.3 | | |
| 2 | 0.4 | 152–148 | 21.5 | 1.5410 | Yellowish oils. |
| 3 | 0.3 | 149–155 | 7.9 | 1.5414 | |
| | | Residue | 12.0 | | |

Fraction 3 was dissolved in 10 ml. of alcohol; 10 ml. of water and 3.5 ml. of conc. hydrochloric acid were added. The solvents were allowed to evaporate spontaneously. The solid residue was recrystallized from a mixture of 60 ml. of alcohol and 50 ml. of ethyl ether (freezer). Yield: 1 g. of white crystals; M.P. 214–215°, decomposition.

*Analysis.*—Calcd. for $C_{23}H_{38}ClNO$ (percent): C, 72.69; H, 10.08; Cl, 9.33. Found (percent): C, 72.49; H, 9.96; Cl, 9.43.

The compound is insoluble in water; soluble in acetone.

The compound of this example was found to be effective as a plant fungicide against downy mildew such as *Phytophtora infestans* (potato blight) and *Peronospora tabacina* (blue mold of tobacco), when employed in accordance with the above-mentioned or other known procedures.

The foregoing illustrates the invention.

I claim:

1. A polynuclear aminoketone of the formula:

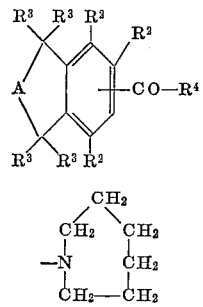

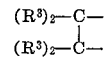

wherein A is a member selected from the group consisting of $(R^3)C=$ and

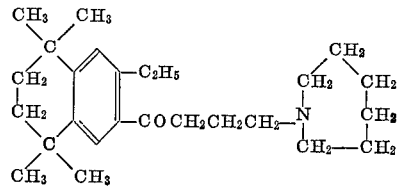

$R^2$ is at least one member selected from the group consisting of H, an alkyl radical having from 1 to 5 carbon atoms, $NO_2$ and a trifluoromethyl radical, $R^3$ is at least one member selected from H and an alkyl radical having from 1 to 5 carbon atoms, and $R^4$ is a member selected from the group consisting of an alkenylene radical having from 3 to 5 carbon atoms and an alkylene radical having from 1 to 5 carbon atoms; and salts of said compounds with acids and phenols.

2. A compound according to claim 1 of the formula

3. The aminoketone of claim 2 in the form of its maleate.

4. A compound in accordance with claim 1 having the formula: 1,1,4,4-tetramethyl-6-ethyl-7-(3 - hexamethyleniminopropionyl) - 1,2,3,4 - tetrahydronaphthalene hydrochloride.

5. A compound in accordance with claim 1 having the formula: 1,1,4,4-tetramethyl-6-isopropyl-7-(4-hexamethyleniminobutyryl)-1,2,3,4-tetrahydronaphthalene maleate.

6. A compound in accordance with claim 1 having the formula: 1,1,3,3,5-pentamethyl-6-(4 - hexamethylenimino-butyryl)-indan maleate.

7. The process for making the aminoketones of claim 1, which comprises reacting a compound represented by the formula:

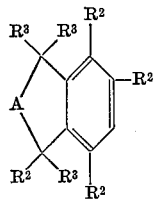

wherein A, $R^2$ and $R^3$ are as set forth in claim 1, with a member selected from the group consisting of $$Cl—CO—R^4—hal$$

and the anhydride of $Cl—R^4—COOH$, wherein $R^4$ is as set forth in claim 1 and hal is a halogen, in the presence of a catalyst for Friedel-Crafts reactions, and reacting the resulting reaction product having the formula:

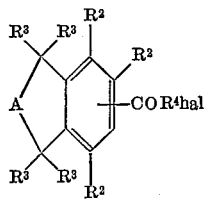

with a compound having the formula,

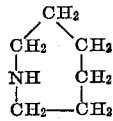

in the presence of an acid acceptor.

8. The process of claim 7, wherein the aminoketone resulting from said process is converted to a salt.

9. The process of claim 7, wherein a compound having the formula:

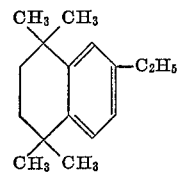

is reacted with a compound of the formula, $$Cl(CH_2)_3COCl$$

in the presence of $AlCl_3$, and the resulting reaction product is reacted with the compound having the formula:

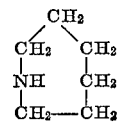

10. The process of claim 9, wherein the resulting aminoketone is converted to its maleate.

References Cited

Chemical Abstracts, Mustafa et al., vol. 67 (1967), p. 4105.

ALEX MAZEL, Primary Examiner

B. I. DENTZ, Assistant Examiner

U.S. Cl. X.R.

260—240, 247.7, 294.7, 326.5, 570.5; 424—244, 248, 256, 274